3,291,830
1-N-ALKYNYL-AMINO-ACENAPHTHENES AND
SALTS THEREOF
Charles Ferdinand Huebner, Chatham, N.J., assignor to
Ciba Corporation, New York, N.Y., a corporation of
Delaware
No Drawing. Filed Oct. 18, 1963, Ser. No. 317,163
4 Claims. (Cl. 260—576)

The present invention concerns N-alkynyl-amines. More especially, it relates to 1-(N-lower alkynyl-amino)-acenaphthenes, in which the triple bond of the lower alkynyl substituent is separated from the nitrogen atom by a lower alkylene radical, particularly to compounds of the formula

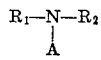

in which A stands for a 1-acenaphthenyl radical, $R_1$ is a lower alkynyl group, in which the triple bond is separated from the nitrogen atom by a lower alkylene radical, and $R_2$ is hydrogen or, more especially an organic radical, or salts thereof, as well as quaternary ammonium derivatives of the compounds forming such derivatives, and process for the preparation of such compounds.

The 1-acenaphthenyl radical, i.e. the group A in the above formula, is unsubstituted or may be substituted. One or more than one of the same or of different substituents may be attached to any position available for substitution in the 1-acenaphthenyl radical; substituents are, for example, lower alkyl, e.g. methyl, ethyl, n-propyl, isopropyl, n-butyl and the like, trifluoromethyl, etherified hydroxyl, particularly lower alkoxy, e.g. methoxy, ethoxy, n-propyloxy, isopropyloxy, n-butyloxy and the like, or esterfied hydroxyl, especially halogeno (representing hydroxyl esterified with a hydrohalic acid), e.g. fluoro, chloro, bromo and the like, or any other suitable substituent. Substituted 1-acenaphthenyl groups representing A are, for example, (lower alkyl)-1-acenaphthenyl, (trifluoromethyl)-1-acenaphthenyl, (etherified hydroxy)-1-naphthenyl, (lower alkoxy)-1-acenaphthenyl, or (esterified hydroxy)1-acenaphthenyl, especially (halogeno)-1-acenaphthenyl, or any equivalent substituted 1-acenaphthyl radical.

The N-lower alkynyl-amino group, in which the triple bond of the alkynyl portion is separated from the nitrogen atom by a lower alkylene radical, is advantageously the group of the previous formula

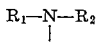

in which $R_1$ is a lower alkynyl group, in which the triple bond is separated from the nitrogen atom by a lower alkylene radical, and which has preferably from three to seven carbon atoms, and $R_2$ is hydrogen or, more especially, an organic radical.

A lower alkynyl group $R_1$ is particularly a lower alk-2-ynyl group, which has preferably from three to five carbon atoms, such as a 2-propynyl group, especially 2-propynyl (or propargyl), as well as 1-methyl-2-propynyl, 1,1-dimethyl-propynyl, 3-methyl-propynyl (or 2-butynyl) and the like. Other lower alkynyl groups, having from three to seven carbon atoms, are, for example, 3-butynyl, 1,2-dimethyl-3-butynyl, 3-pentynyl, 3-hexynyl and the like.

The lower alkynyl substitutent in the N-lower alkynyl-amino group may be the sole substitutent of the amino-nitrogen atom (i.e. $R_2$ in the above formula is hydrogen). However, in addition to the alkynyl group, the amino-nitrogen is preferably substituted by an organic radical, more especially an aliphatic radical; the N-lower alkynyl-amino group is, therefore, above all an N-lower alkynyl-N-aliphatic substituted-amino group. An aliphatic radical representing such substituent, is above all lower alkyl, having preferably from one to seven carbon atoms, particularly methyl, as well as ethyl, n-propyl, isopropyl,n-butyl, secondary butyl, tertiary butyl, n-pentyl and the like. Other aliphatic radicals representing $R_2$ are, for example, lower alkenyl, having preferably from two to seven carbon atoms, e.g. allyl, 1-methyl-allyl, 2-methyl-allyl, 2-butenyl and the like, or lower alkynyl, having preferably from three to seven carbon atoms, such as one of the above mentioned alkynyl radicals. $R_2$ may also represent a carbocyclic aryl-aliphtic radicals, such as phenyl-lower alkyl, e.g. benzyl, 1-phenylethyl, 2-phenylethyl and the like, or substituted phenyl-lower alkyl, in which phenyl is substituted by lower alkyl, lower alkoxy, halogeno, trifluoromethyl or any other substituents.

Salts of the compounds of this invention are particularly acid addition salts, such as the pharmaceutically acceptable, non-tioxic acid addition salts, such as those with inorganic acids, e.g. hydrochloric, hydrobromic, nitric, sulfuric, phosphoric acids and the like, or with organic acids, such as organic carboxylic acids, e.g. acetic glycolic, maleic, hydroxymaleic, malic, tartaric, citric, salicylic, o-acetyloxy-benzoic, nicotinic, isonicotinic acd and the like, or organic sulfonic acids, e.g. methane sulfonic, ethane sulfonic, 2-hydroxyethane sulfonic, p-toluene sulfonic, napththalene 2-sulfonic acid and the like. Apart from pharmaceutically acceptable acid addition salts, other salts are also included within the scope of the acid addition salts; they can serve as intermediates in the purification of the free compounds or in the preparation of other, for example, pharmaceutically acceptable, acid addition salts, or are useful for identification and characterization. Acid addition salts, which are primarily used for identification purposes, are, for example, those with acidic organic nitro compounds, e.g. picric, picrolonic, flavianic acid and the like, or with metal complex acids, e.g. phosphotungstic, phosphomolybdic, chloro-platinic, Reinecke acid and the like.

Quaternary ammonium derivatives of the compounds of this invention, which form such derivatives, i.e. in which the amino group is a tertiary amino group, are particularly those with reactive esters formed by alcohols and strong acids, such as those with lower alkyl halides, e.g. methyl, ethyl, propyl or isopropyl chloride, bromide or iodide and the like, di-lower alkyl sulfates, e.g. dimethyl sulfate, diethyl sulfate and the like, lower alkyl lower alkane sulfonates, e.g. methyl or ethyl methane sulfonate or ethane sulfonate and the like, lower alkyl monocyclic carboxylic aryl sulfonates, e.g. methyl p-toluene sulfonate and the like, phenyl-lower alkyl halides, e.g. benzyl, 1-phenylethyl or 2-phenylethyl chloride, bromide or iodide and the like, or any other suitable reactive ester compound. Also included as quaternary ammonium compounds are the quaternary ammonium hydroxides, and the quaternary ammonium compounds having an anions those of other inorganic or of organic acids, such as, for example, those of the other acids used fcr the preparation of the previously-mentioned acid addition salts.

The compounds of this invention have monoamine oxidase inhibiting properties of unusually prolonged duration. Pharmacological tests show, that animals pretreated with a compound of this invention, when given a catecholamine-releasing substance, i.e. a compound capable of releasing epinephrine or norepinephrine, such as, for example, reserpine or a reserpine analog, e.g. methyl 18-0-(2-tetrahydrophyranyl-reserpate and the like, show a marked increase in activity. This effect is due to the fact that the released catecholamines, i.e. epinephrine or norepinephrine, cannot be metabolized, because the compound of this invention used as the test substance inhibits the metabolizing effects of the monoamine oxidase.

As compared with other known monoamine oxidase inhibiting compounds, the compounds of this invention are free from any central nervous system stimulating properties. Furthermore, they do not show any blood pressure-raising effects; compounds of this invention even exert some antihypertensive properties.

In view of the above-described pharmacological effects, the compounds of this invention are, therefore, useful as stimulating agents in the treatment of fatigue, depression and the like.

A preferred group of compounds are those of the following formula

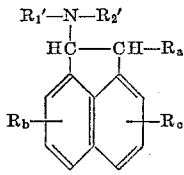

in which $R_1'$ is a lower 2-alkynyl radical having preferably from three to five carbon atoms, $R_2'$ is lower alkyl, having preferably from one to four carbon atoms, especially methyl, the group $R_a$ is preferably hydrogen, as well as lower alkyl, having preferably from one to four carbon atoms, and each of the groups $R_b$ and $R_c$ is hy- well as lower alkyl, having preferably from one to four carbon atoms, lower alkoxy, having preferably from one to four carbon atoms, or halogeno having preferably an atomic weight between 19 and 80, both inclusive, or the acid addition salts thereof. This group of compounds is represented, for example, by the compounds of the formula:

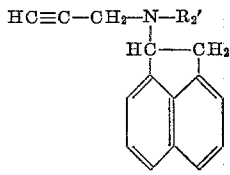

in which $R_2'$ has the previously-given meaning, or the acid addition salts, particularly the pharmaceutically acceptable acid addition salts, thereof, especially by 1-(N-methyl-N-propargylamino)-acenaphthene or the acid addition salts, particularly the pharmaceutically acceptable acid addition salts, thereof.

The compounds of this invention are prepared according to known methods, for example, by converting in a 1-$R_0$-acenaphthene, particularly a compound of the formula A—$R_0$, in which A has the previously-given meaning, and $R_0$ is a substituent capable of being converted into an N-lower alkynyl-amino group, in which the triple bond of the lower alkynyl portion is separated from the nitrogen atom by a lower alkylene radical, particularly into a group of the formula

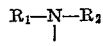

in which $R_1$ and $R_2$ have the previously-given meaning, the group $R_0$ into an N-lower alkynyl-amino group, in which the triple bond of the lower alkynyl portion is separated from the nitrogen atom by a lower alkylene radical, particularly into a group of the formula

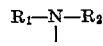

in which $R_1$ and $R_2$ have the previously-given meaning, and, if desired, converting a resulting salt into the free compound or into another salt, and/or, if desired, replacing in a resulting compound having a monosubstituted N-lower alkynyl-amino group the hydrogen of the amino-nitrogen by an organic radical, and/or, if desired, converting a resulting compound into a salt thereof, and/or, if desired, converting a resulting compound capable of forming a quaternary ammonium derivative into a quaternary ammonium compound, and/or, if desired, converting a resulting quaternary ammonium compound into another quaternary ammonium compound, and/or, if desired, converting a resulting mixture of isomers into the single isomers.

A particularly useful 1-$R_0$-acenaphthene starting material, in which $R_0$ is capable of being converted into the desired N-lower alkynyl-amino group, is a reactive esterified hydroxy group. In a 1-reactive esterified hydroxy-acenaphthene starting material, the hydroxyl is esterified with a strong inorganic acid, particularly a hydrohalic acid, e.g. hydrochloric, hydrobromic, hydriodic acid and the like, as well as a strong organic sulfonic acid, such as a carbocyclic aryl sulfonic acid, e.g. p-toluene sulfonic, 4-bromo-benzene sulfonic, 3-nitro-benzene sulfonic acid and the like, or an aliphatic sulfonic acid, e.g. methane sulfonic, 2-hydroxy-ethane sulfonic acid. The reactive esterified hydroxyl group is, therefore, above all halogeno having an atomic weight greater than 19, e.g. chloro, bromo and the like, as well as an organic sulfonyloxy group, e.g. p-toluene sulfonyloxy, 4-bromo-phenyl-sulfonyloxy, 3-nitro-phenyl-sulfonyloxy, methyl-sulfonyloxy, 2-hydroxyethylsulfonyloxy and the like.

A 1-(reactive esterified hydroxy)-acenaphthene starting material is converted into the desired 1-(N-lower alkynyl-amino)-acenaphthene compound by treatment with an N-lower alkynyl-amine, in which the triple bond of the lower alkynyl portion is separated from the nitrogen atom by a lower alkylene radical, particularly with a compound of the formula $R_1$—NH—$R_2$, in which $R_1$ and $R_2$ have the previously-given meaning. Treatment of the reactive ester compound with the amine is preferably carried out in the presence of an inert diluent, e.g. acetone, ethanol, p-dioxane, tetrahydrofuran and the like. The generated acid may be neutralized by using an excess of the amine or by carrying out the reaction in the presence of another base, e.g. sodium or potassium carbonate or hydrogen carbonate and the like. If necessary, the reaction is performed while cooling or at an elevated temperature, in a closed vessel and/or in the atmosphere of an inert gas, e.g. nitrogen.

The 1-(reactive esterified hydroxy)-acenaphthene starting materials are known or may be prepared according to known methods, for example, by reacting a 1-hydroxy-acenaphthene compound with a reagent capable of converting such hydroxyl group into a reactive esterified hydroxy group; suitable reagents for this purpose are, for example, phorphorus halides, e.g. phosphorus pentachloride, phosphorus tribromide and the like, thionyl halides, e.g. thionyl chloride and the like, or organic sulfonic acid halides, e.g. p-toluene sulfonyl chloride and the like; the organic sulfonic acid halides are preferably used in the presence of a base, e.g. pyridine and the like.

Another group $R_0$ in a 1-$R_0$-acenaphthene starting material is an N-monosubstituted amino group, particularly a group of the formula

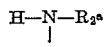

in which $R_2^a$ is an organic radical. Conversion of such amino group into the desired N-lower alkynyl-amino group is carried out, for example, by treating the 1-(N-monosubstituted amino)-acenaphthene starting material with a reactive ester of a lower alkynol, in which the triple bond is separated from the reactive esterified hydroxyl group by a lower alkylene radical. Reactive esters of such lower alkynols are those with strong inorganic or organic acids, such as the acids mentioned before; they are above all lower alkynyl halides, e.g. chlorides, bromides and the like, in which the triple bond is separated from halogeno by a lower alkylene radical. Especially useful are the lower alk-2-ynyl halides, having preferably from three to five carbon atoms, particularly 2-propynyl halides, as well as other lower alkynyl halides of the above type. Other reactive esters of lower alkynols are, for example, those with strong organic sulfonic acids, such as those previously mentioned.

The reaction of the above amine starting material with the reactive ester of a lower alkynol is preferably carried out in the presence of a suitable diluent, and, if desired, of an additional base, for example, an inorganic base, such as an alkali metal carbonate, e.g. sodium or potassium carbonate or hydrogen carbonate and the like. If necessary, it may be performed while cooling or at an elevated temperature, in a closed vessel and/or in the atmosphere of an inert gas, e.g. nitrogen.

The 1-(N-monosubstituted amino)-acenaphthene starting materials are known or may be prepared according to known methods, for example, by reacting a 1-(reactive esterified hydroxy)-acenaphthene, in which the reactive esterified hydroxy group, is, for example, halogeno, e.g. chloro, bromo and the like, as well as organic sulfonyloxy, e.g. 4-methyl-phenyl-sulfonyloxy and the like (such as one of the previously-described compounds), with an N-monosubstituted amine, such as an amine of the formula $H_2N—R_2^a$, in which $R_2^a$ has the previously-given meaning, if desired, in the presence of a base, according to the method described before. Other 1-(N-monosubstituted amino)-acenaphthene starting materials may also be prepared, for example, by reacting an acenaphthen-1-one compound with an N-monosubstituted amine and reducing in the resulting Schiff-base derivative the —C=N-double bond, for example, with sodium borohydride and the like. Those, in which the α-carbon atom of the substituent in an N-monosubstituted amino group carries two hydrogens, may also be prepared by reacting a 1-(N-unsubstituted amino)-acenaphthene compound with an acylating agent, such as an organic carboxylic acid halide, e.g. chloride and the like, or an organic acid anhydride, and converting in a resulting 1-(N-organic carbonyl-amino)-acenaphthene compound (including a 1-(N-formyl-amino)-acenaphthene compound, which may be formed by reacting the 1-amino-acenaphthene compound with formic acid in the presence of acetic acid anhydride), the carbonyl group into methylene by reduction, for example, with lithium aluminum hydride and the like, or by any other suitable method.

Certain 1-(N-monosubstituted amino)-acenaphthene starting materials, especially those used for the preparation of 1-(N,N-di-lower alkynyl-amino)-acenaphthene compounds, in which the two lower alkynyl groups are identical and have the previously-given meaning, may be formed in situ and converted into the desired 1-(N,N-di-lower alkynyl-amino)-acenaphthene without isolation. They may be formed, for example, by reacting a 1-(N-unsubstituted amino)-acenaphthene compound with a reactive ester of a lower alkynol, such as a lower alkynyl halide, e.g. bromide and the like, and any intermediate 1-(N-mono lower alkynyl-amino)-acenaphthene compound is converted into the 1-(N,N-di-lower alkynyl-amino)-acenaphthene without isolation, if an excess of the reactive ester of the lower alkynol is employed.

Another group $R_0$ in a 1-$R_0$-acenaphthene starting material is an N-(di-halogeno-lower alkyl)-amino group, in which the two halogeno atoms of the di-halogeno-lower alkyl portion occupy two neighboring carbon atoms which are separated from the nitrogen atom by a lower alkylene radical, particularly a substituent of the formula

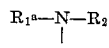

in which $R_2$ has the previously-given meaning, and $R_1^a$ is a di-halogeno-lower alkyl group, in which the two halogeno atoms occupy two neighboring carbon atoms which are separated from the nitrogen atom by a lower alkylene radical. The two halogeno atoms in the above di-halogeno-lower alkyl portion are above all bromo, but may also be chloro and the like.

The 1-[N-(di-halogeno-lower alkyl)-amino]-acenaphthene starting materials in which di-halogeno-lower alkyl has the previously-given meaning, are converted into the desired compounds of this invention by eliminating two moles of hydrogen halide according to known methods.

Thus, the starting material may be treated with a suitable base, for example, a metal alcoholate, such as an alkali metal lower alkoxide, e.g. potassium tertiary butoxide and the like. Preferably, the reaction is carried out in the presence of a diluent, such as an alcohol, e.g. tertiary butanol and the like, and at an elevated temperature, if necessary, in the atmosphere of an inert gas, e.g. nitrogen.

The starting material used in the above procedure may be prepared, for example, by treating a 1-(N-lower alkenyl-amino)-acenaphthene compound, in which the double bond of the lower alkenyl portion is separated from the nitrogen atom by a lower alkylene radical (and which may be prepared by any of the previously-described methods for the corresponding compounds having an N-lower alkynyl amino substituent, using as the reagents the appropriate lower N-alkenyl-amine and reactive esterified lower alkenol, respectively), with at least two moles of a halogen, especially bromine, as well as chlorine and the like, preferably in the presence of a suitable diluent, e.g. glacial acetic acid and the like.

As indicated above, a hydrogen substituting the amino-nitrogen of a monosubstituted N-lower alkynyl-amino group in a resulting compound may be replaced by an organic radical; such organic radical is primarily an aliphatic, particularly a lower alkyl group, as well as a carbocyclic aryl-aliphatic radical and the like. Replacement of the hydrogen by such group is carried out according to known methods, for example, by treatment with a reactive ester of an aliphatic alcohol, especially lower alkanol, as well as a carbocyclic aryl-aliphatic alcohol, particularly a corresponding halide, e.g. chloride, bromide, iodide and the like, or a corresponding sulfonyloxy compound, e.g. 4-methylphenyl-sulfonyloxy, 4-bromo-phenyl-sulfonyloxy, 3-nitro-phenyl-sulfonyloxy, methyl-sulfonyloxy, 2-hydroxyethyl-sulfonyloxy compound and the like. The reaction is performed according to the previously-described conditions, if necessary, in the presence of a base. N-methylation may be carried out, for example, by treatment with a mixture of formic acid and formaldehyde.

A resulting acid addition salt may be converted into the free compound according to known methods, for example, by treating it with a base, preferably in the presence of water, such as with a metal hydroxide, for example, an alkali metal hydroxide or an alkaline earth metal hydroxide, e.g. lithium hydroxide, sodium hydroxide, potassium hydroxide, calcium hydroxide and the like, a metal carbonate, such as an alkali metal or an alkaline earth metal carbonate or hydrogen carbonate, e.g. sodium, potassium or calcium carbonate or hydrogen carbonate and the like, ammonia and the like, or with a hydroxyl ion exchange preparation, or with any other suitable reagent.

A resulting acid addition salt may be converted into another acid addition salt according to known methods; for example, a salt with an inorganic acid may be treated with a metal salt, e.g. sodium, barium, silver and the like, salt of an acid in a suitable diluent, in which a resulting inorganic salt is insoluble and is thus removed from the reaction medium. An acid addition salt may also be converted into another acid addition salt by treatment with an anion exchange preparation.

A free compound may be converted into an acid addition salt according to known methods, for example, by reacting the base, preferably a solution thereof in a solvent or solvent mixture, with the appropriate acid or a solution thereof, or with an anion exchange preparation and isolating the desired salt, which may be obtained in the form of a hydrate or may contain solvent of crystallization.

A compound of this invention capable of forming a quaternary ammonium derivative, is so converted, for example, by reacting it with a reactive ester of an alcohol and a strong acid. Reactive esters are primarily those yielding lower alkyl or phenyl-lower alkyl quaternary ammonium salts, such as halides, sulfates or sulfonates. The quaternizing reaction may be performed in the absence or presence of a suitable, inert solvent, while cooling, at room temperature or at an elevated temperature, under atmospheric or increased pressure, and/or in the atmosphere of an inert gas, e.g. nitrogen.

A resulting quaternary ammonium compound may be converted into another quaternary ammonium compound, such as a quaternary ammonium hydroxide, for example, by reacting a quaternary ammonium halide with a silver oxide or a quaternary ammonium sulfate with barium hydroxide, by treating a quaternary ammonium salt with an anion exchange preparation, by electrodialysis or any other suitable procedure. From a resulting quaternary ammonium hydroxide, there may be prepared other quaternary ammonium salts with acids, such as those mentioned for the preparation of the acid addition salts, or with mono-lower alkyl sulfates, e.g. methyl sulfate, ethyl sulfate and the like. A quaternary ammonium compound may also be converted directly into another quaternary ammonium salt without the formation of the quaternary ammonium hydroxide; for example, a quaternary ammonium iodide may be reacted with freshly prepared silver chloride or with hydrochloric acid in anhydrous methanol to yield the corresponding quaternary ammonium chloride. A quaternary ammonium salt may also be converted into another quaternary ammonium salt by treatment with an anion exchange preparation. Quaternary ammonium derivatives may also be obtained in the form of the hydrates or may contain solvent of crystallization.

The new compounds of this invention may be obtained in the form of mixtures of isomers, which may be separated into the individual isomers according to known methods. Thus, racemates of compounds of this invention may be resolved into the optically active d- and l- forms to known resolution procedures, for example, by reacting the free base of a d,l-compound, preferably a solution thereof, with one of the optically active forms of an acid containing an asymmetric carbon atom. Especially useful as optically active forms of salt-forming acids having an asymmetric carbon atom are D-tartaric acid (also known as l-tartaric acid) and L-tartaric acid (also known as d-tartaric acid); the optically active forms of malic, mandelic, camphor 10-sulfonic, quinic acid or any other suitable acid, may also be employed. The resulting salts formed by the optically active acid with the optically active forms of the base are separated on the basis of solubility differences, for example, by fractional crystallization and the like. The separated salts may be converted into the free and optically active bases or into other salts, and a resulting optically active base may be converted into an acid addition salt or a quaternary ammonium compound; these reactions are carried out according to previously-described known procedures.

The invention also comprises any modification of the process wherein a compound obtainable as an intermediate at any stage of the process is used as starting material and the remaining step(s) or the process is (are) carried out, as well as any new intermediates.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

To a mixture of 2.0 g. of 1-(N-methyl-amino)-acenaphthene and 0.75 g. of sodium carbonate in 15 ml. of acetone is added dropwise 0.84 g. of propargyl bromide while stirring. The reaction mixture is then refluxed for four hours, cooled and filtered. The filtrate is evaporated under reduced pressure and treated with a solution of hydrogen chloride in ethanol. The desired 1-(N-methyl-N-propargyl-amino)-acenaphthene hydrochloride of the formula

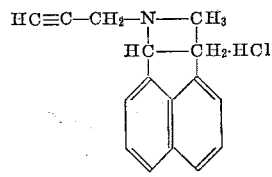

is precipitated by adding diethyl ether and is recrystallized from ethanol, M.P. 215–216°.

The starting material used in the above reaction is prepared as follows: A solution of 18.0 g. of potassium chromate in 750 ml. of acetic acid and a minimum amount of water is added dropwise over a period of four hours to a solution of 20.0 g. of acenaphthen-1-ol in 1000 ml. of acetic acid while stirring. After agitating for an additional thirty minutes, the reacting mixture is poured into a large amount of water. The resulting acenaphthen-1-one is filtered off and recrystallized from ethanol, M.P. 120–122°; yield: 14 g.

A solution of 14.0 g. of acenaphthen-1-one and 14.0 g. of hydroxylamine hydrochloride in 70 ml. of ethanol and 70 ml. of pyridine is heated on the steam bath for two hours. The solvent is evaporated and the 1-hydroxyimino-acenaphthene is purified by recrystallization from ethanol, M.P. 166–168°.

A mixture of 5.0 g. of 1-hydroxyimino-acenaphthene, 25 ml. of toluene and 150 ml. of ethanol containing 3.0 g. of gaseous hydrogen chloride is treated with hydrogen at a pressure of about three atmospheres and in the presence of 1.0 g. of a palladium catalyst (10 percent of palladium-on-charcoal). The catalyst is filtered off, the filtrate is evaporated to dryness, and the resulting 1-amino-acenaphthene hydrochloride is recrystallized from a mixture of ethanol and diethyl ether, M.P. 200°.

A mixture of 4.0 ml. of acetic acid anhydride and 1.68 ml. of formic acid is stirred on a water bath at 50–60° for two hours, then cooled to room temperature and, while stirring, treated dropwise with 5.0 g. of 1-amino-acenaphthene (prepared from the previously-described hydrochloride by dissolving the salt in a minimum of water, adding a concentrated aqueous solution of sodium hydroxide and extracting the free 1-amino-acenaphthene with diethyl ether) at such a rate that the temperature does not rise above 40°. Stirring is continued for an additional half-hour; 20 ml. of diethyl ether is added and, after stirring overnight at room temperature, the solid material is extracted with chloroform. The organic phase is separated, washed with water, an aqueous solution of sodium hydrogen carbonate, water, 5 percent hydrochloric acid, and again water, dried over magnesium sulfate and evaporated. The resulting 1-(N-formyl-amino)-acenaphthene is recrystallized from ethanol, M.P. 174–175°.

To a suspension of 1.1 g. of lithium aluminum hydride in 25 ml. of diethyl ether is added a solution of 2.9 g. of 1-(N-formyl-amino)-acenaphthene in 90 ml. of tetrahydrofuran at a rate sufficient to maintain gentle reflux. Refluxing is then continued for five hours; the reaction mixture is allowed to stand overnight at room temperature, and is subsequently decomposed by adding with caution 1.1 ml. of water, 2.2 ml. of a twelve percent aqueous solution of sodium hydroxide and 3.3 ml. of water, and filtered. The filtrate is dried over magnesium sulfate and evaporated to dryness to yield the desired 1-(N-methyl-amino)-acenaphthene, which forms a hydrochloride salt by treatment with an ethanol solution of hydrogen chloride; the 1-(N-methyl-amino)-acenaphthene hydrochloride meets at 200° after recrystallization from a mixture of ethanol and diethyl ether.

*Example 2*

The following 1-(N-lower alkynyl-amino)-acenaphthene compounds are prepared according to the previously-described procedure by selecting the appropriate starting material.

compositions consisting essentially of a pharmacologically effective amount of a 1-(N-lower alkynyl-amino)-ace-

| 1-R₀-acenaphthene starting material | Reagent | 1-(N-lower alkynyl-amino)-acenaphthene product |
| --- | --- | --- |
| 1-(N-ethyl-amino)-acenaphthene | Propargyl bromide | 1-(N-ethyl-N-propargyl-acenaphthene. |
| 1-amino-acenaphthene | Excess of propargyl bromide | 1-(N,N-di-propargyl-amino)-acenaphthene. |
| 1-(N-benzyl-amino)-acenaphthene | Propargyl bromide | 1-(N-benzyl-N-propargyl-amino)-acenaphthene. |
| 1-amino-acenaphthene | α,α-dimethyl-propargyl chloride | 1-[N-(α,α-dimethyl-propargyl)-amino]-acenaphthene. |
| 1-(N-methyl-amino)-acenaphthene | 2-butenyl bromide | 1-[N-(2-butynyl)-N-methyl-amino]-acenaphthene. |
| 5-chloro-1-(N-methyl-amino)-acenaphthene | Propargyl bromide | 5-chloro-1-(N-methyl-N-propargyl-amino)-acenaphthene. |
| 6-methyl-1-(N-methyl-amino)-acenaphthene | ___do___ | 6-methyl-1-(N-methyl-N-propargyl-amino)-acenaphthene. |
| 6-methoxy-1-(N-propyl-amino)-acenaphthene | ___do___ | 6-methoxy-1-(N-propargyl-N-propyl-amino)-acenaphthene. |

*Example 3*

A mixture of 4.2 g. of 1-chloro-acenaphthene (prepared from acenaphthen-1-one by treatment with phosphorus chloride) and 2.4 g. of propargylamine in 25 ml. of isopropanol is refluxed for six hours, then cooled and filtered to remove the solid propargylamine hydrochloride. The filtrate is evaporated, and the residue is treated with a 10 N ethanol solution of hydrogen chloride to yield the desired 1-(N-propagryl-amino)-acenaphthene hydrochloride.

*Example 4*

To a mixture of 9.3 g. of potassium tertiary butoxide in 30 ml. of tertiary butanol is added 13.1 g. of 1-[N-(2,3-dibromopropyl)-N-methyl-amino]-acenaphthene hydrochloride while stirring. The reaction mixture is refluxed for one hour; the tertiary butanol is then distilled off under reduced pressure; and the residue is diluted with water. The organic material is extracted with diethyl ether; the organic solution is dried and treated with a 6 N ethanol solution of hydrochloric acid. The desired 1-(N-methyl-N-propargyl-amino)-acenaphthene hydrochloride crystallizes and is recrystallized from ethanol, M.P. 215–216°. The compound is identical with the product obtained according to the procedure described in Example 1.

The starting material used in the above reaction is prepared as follows: To a solution of 2.0 g. of 1-(N-methyl-amino)-acenaphthenene in 30 ml. of acetone containing 1.1 g. of sodium carbonate is added dropwise while stirring 1.25 g. of allyl bromide. The reaction mixture is refluxed for four hours, is filtered and then evaporated. The residue is dissolved in water; the aqueous solution is made basic with ammonium hydroxide and is extracted with diethyl ether. The organic phase is washed, dried over magnesium sulfate and evaporated. The residue is treated with a 10 N ethanol solution of hydrogen chloride to yield the 1-(N-allyl-N-methyl-amino)-acenaphthene hydrochloride.

To a suspension of the 1-(N-allyl-N-methyl-amino)-acenaphthene hydrochloride in acetic acid is added while stirring 9 ml. of a 5 molar solution of bromide in acetic acid. After completion of the addition, the reaction mixture is diluted with diethyl ether, whereupon the desired 1-[N-(2,3-dibromo-propyl)-N-methyl-amino]-acenaphthene hydrochloride precipitates, which is used without further purification.

*Example 5*

A mixture of 1.39 g. of 97 percent formic acid and 0.88 g. of paraformaldehyde is heated to 60°, and 5.1 g. of 1-[N-(α,α-dimethyl-propargyl)-amino]-acenaphthene is added. The temperature is maintained at 60° for twenty hours; the reaction mixture is then cooled and evaporated to dryness. The residue is taken up in a small amount of water, the mixture is made basic with an aqueous solution of sodium hydroxide, and the organic material is extracted with diethyl ether. The organic solution is washed, dried and evaporated to yield the 1-[N-(α,α-dimethyl-propargyl)-N-methyl-amino]-acenaphthene, which is converted into its hydrochloride by treatment with an ethanol solution of hydrogen chloride.

*Example 6*

Also included within the scope of this invention are naphthene compound, in which the triple bond of the alkynyl portion is separated from the nitrogen atom by a lower alkylene radical, particularly of a compound of the formula

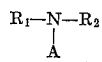

in which A, $R_1$ and $R_2$ have the previously given meaning, or a pharmaceutically acceptable acid addition salt thereof, as well as a quaternary ammonium compound of the compound forming such derivatives, as the pharmacologically effective component, together with a pharmaceutically acceptable carrier. These compositions are represented by those consisting essentially of a pharmacologically effective amount of a compound of the formula

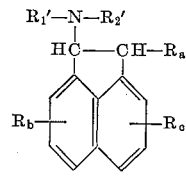

in which $R_1'$, $R_2'$, $R_a$, $R_b$ and $R_c$ have the previously-given meaning, or a pharmaceutically acceptable acid addition salt, particularly those consisting essentially of a pharmacologically effective amount of a compound having the following formula

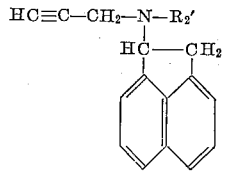

in which $R_2'$ has the previously given meaning, or a pharmaceutically acceptable acid addition salt of such compound, as the pharmacologically effective component, together with a pharmaceutically acceptable carrier.

The compositions are prepared by combining the active ingredient with a major amount of a pharmaceutically acceptable organic or inorganic carrier. The compositions of this invention may be made up to contain from about 1 percent to at most 50 percent, preferably from about 5 percent to about 40 percent, by weight, of the active ingredient.

Tablets, capsules, dragees and the like represent the preferred oral form of administration. These orally applicable compositions may be compounded to have per single dosage unit from about 0.0025 g. to about 0.025 g., of the active ingredient, which is preferably used in the form of its pharmaceutically acceptable acid addition salt, such as one of the above-mentioned salts with an inorganic or organic acid, e.g. hydrochloric, sulfuric, phosphoric, tartaric, maleic, citric, methane sulfonic, p-toluene sulfonic, naphthalene 2-sulfonic acid and the like.

Apart from the active compound, the orally applicable preparations contain a pharmaceutically acceptable carrier prepared from substances commonly employed in the pharmaceutical art of preparing dosage unit compositions, including excipients, binders, fillers, stabilizers or any other ingredients, such as starches, e.g. corn starch, wheat starch and the like, sugars, e.g. lactose, glucose and the like, stearic acid or salts thereof, such as magnesium stearate, calcium stearate and the like, gums, tragacanth, acacia, polyalkylene glycols and the like, or any other known carrier for such compositions. The quantities of these materials may vary widely and depend inter alia upon the desired physical appearance (hardness and the like), size of the composition and the like. Encapsulation may also be effected using, if desired, the same excipients as those used for tablets. The compounding of the formulations is generally carried out in the manner normally employed in the art. Any compatible color, approved and certified under the provisions of the Federal Food, Drug and Cosmetic Law may be used for aesthetic purposes or as a means of identification.

Parenteral solutions represent other pharmaceutical preparations containing from about 1 percent to about 10 percent, of the active ingredient. In view of the fact that the active ingredient in the form of its pharmaceutically acceptable acid addition salt is a water-soluble substance, parenteral solutions contain water (purified for the use in parenteral solutions) as the primary solvent; other ingredients, particularly stabilizers, such as, for example, anti-oxidants, e.g. thiourea, sodium sulfide, sodium metabisulfite, ascorbic acid, cysteine hydrochloride, sodium formaldehyde sulfoxylate and the like, mono-thioglycerol, thiosorbital and the like, buffer combinations, such as, for example, acetic acid: sodium acetate, potassium phthalate: sodium hydroxide, potassium dihydrogen phosphate: sodium hydroxide and the like, salts for making isotonic solutions, e.g. sodium chloride and the like, are added to ensure stable solutions suitable for injection. It is desirable to maintain a pH of about 7, and any buffers yielding such pH may be utilized.

Tablets, each containing 0.015 g. of 1-(N-methyl-N-propargyl-amino)-acenaphthene hydrochloride, may be prepared as follows (for 10,000 tablets):

Ingredients: G.
1 - (N - methyl - N - propargyl - amino)-
  acenaphthene hydrochloride _____ 150.0
Lactose, spray dried _____ 1,260.0
Corn starch _____ 75.0
Stearic acid _____ 15.0

The 1-(N-methyl-N-propargyl-amino)-acenaphthene hydrochloride is passed through a No. 60 screen, and the lactose, the corn starch and the stearic acid through a No. 30 screen. The ingredients are mixed in a mixer and then compressed into tablets, weighing 0.15 g., using ⁹⁄₃₂ inch standard concave punches.

An injectable solution containing 0.005 g. of 1-(N-methyl-N-propargyl-amino)-acenaphthene hydrochloride per one ml. of solution may be prepared as follows (for 1000 ml.):

Ingredients:
1 - (N - methyl - N - propargyl - amino)-
  acenaphthene hydrochloride _____g__ 5.0
Sodium chloride _____g__ 6.0
Water for injection, q.s. _____ml__ 1,000.0

The 1-(N-methyl-N-propargyl-amino)-acenaphthene hydrochloride and the sodium chloride are dissolved in 900 ml. of water for injection. The solution is then brought to a total volume of 1000 ml., filtered through a medium porosity sintered glass filter and filled in 1.1 ml. portions into one ml. ampules. The latter are sealed, sterilized at 110° for thirty minutes and inspected.

What is claimed is:
1. A member selected from the group consisting of compound of the formula

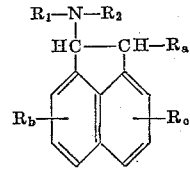

in which $R_1'$ is a lower 2-alkynyl radical having preferably from three to five carbon atoms, $R_2'$ is lower alkyl, the group $R_a$ is a member selected from the group consisting of hydrogen and lower alkyl, and each of the groups $R_b$ and $R_c$ is a member selected from the group consisting of hydrogen, lower alkyl, or halogeno and an acid addition salt thereof.

2. A member selected from the group consisting of compound of the formula

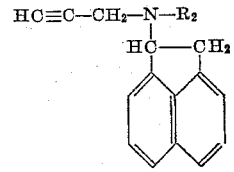

in which $R_2'$ is lower alkyl and an acid addition salt thereof.

3. A member selected from the group consisting of a 1-(N-methyl-N-propargyl-amino)-acenaphthene and an acid addition salt thereof.

4. 1-(N-methyl-N-propargyl-amino)-acenaphthene hydrochloride.

No references cited.

CHARLES B. PARKER, *Primary Examiner.*
ROBERT V. HINES, *Assistant Examiner.*